(12) United States Patent
Hosokawa et al.

(10) Patent No.: US 6,758,986 B1
(45) Date of Patent: Jul. 6, 2004

(54) MAGNET POWDER AND METHOD FOR PREPARATIONS THEREOF

(75) Inventors: Seiichi Hosokawa, Hyogo (JP); Sachio Toyota, Osaka (JP)

(73) Assignee: Sumitomo Special Metals Co., Ltd. (JP)

( * ) Notice: Subject to any disclaimer, the term of this patent is extended or adjusted under 35 U.S.C. 154(b) by 265 days.

(21) Appl. No.: 09/830,626

(22) PCT Filed: Aug. 23, 2000

(86) PCT No.: PCT/JP00/05667

§ 371 (c)(1),
(2), (4) Date: Apr. 30, 2001

(87) PCT Pub. No.: WO01/16969

PCT Pub. Date: Mar. 8, 2001

(30) Foreign Application Priority Data

Aug. 31, 1999 (JP) .......................................... 11-287169

(51) Int. Cl.$^7$ ................................................. H01F 1/11
(52) U.S. Cl. .................................. 252/62.57; 252/62.59
(58) Field of Search ........................... 252/62.59, 62.57

(56) References Cited

U.S. PATENT DOCUMENTS

| | | | | |
|---|---|---|---|---|
| 4,636,433 A | * | 1/1987 | Kubo et al. .................. | 428/328 |
| 5,958,284 A | * | 9/1999 | Takami et al. ............ | 252/62.63 |
| 6,139,766 A | | 10/2000 | Taguchi et al. | |

FOREIGN PATENT DOCUMENTS

JP 11-195517 7/1999

OTHER PUBLICATIONS

Smolenskii et al., "Investigation of Ferrimagnets with the Structure of Magnetoplumbite and Garnet in Strong Pulse Magnetic Fields", pp. 1405–1408, 1961, Bulletin of the Academy of Sciences of the USSR, vol. 25, No. 11.

Wei et al., "The Temperature Dependence of Magnetic Properties of Zn-Ti Substituted Ba–ferrite Paticles for Magnetic Recording", pp. 69–72, Journal of the Magnetics Society of Japan vol. 21, Supplement No. S2.

Du et al., "Magnetic Properties and High Temperature Composition of the $La_xBa_{(1-x)}Fe_{(12-x)}Zn_xO_{19}$ Ferrites", pp. 793–794, 1983, Journal of Magnetism and Magnetic Materials 31–34.

* cited by examiner

Primary Examiner—C. Melissa Koslow
(74) Attorney, Agent, or Firm—Nixon Peabody LLP; Jeffrey L. Costellia

(57) ABSTRACT

The production is performed by calcining ferrite magnetic powder in which La is substituted for part of Sr and Ti, Zn, and Co are substituted for part of Fe at temperatures of 1100° C. to 1450° C. The magnetization is improved by substituting Zn for part of Fe, and by substituting Ti for part of Fe for the purpose of charge compensation. In addition, the coercive force is improved by substituting Co for part of Fe, and by substituting La for part of Sr for the purpose of charge compensation. Ti is used for the charge compensation, so that it is possible to reduce the cost.

11 Claims, 8 Drawing Sheets

RELATIONSHIP BETWEEN AMOUNT y OF Ti, Zn
AND MAGNETIC PROPERTIES

RELATIONSHIP BETWEEN AMOUNT y OF Ti, Zn
AND MAGNETIC PROPERTIES

RELATIONSHIP BETWEEN AMOUNT y OF Ti, Zn
AND MAGNETIC PROPERTIES

RELATIONSHIP BETWEEN AMOUNT y OF Ti
AND MAGNETIC PROPERTIES

RELATIONSHIP BETWEEN AMOUNT OF Ti
AND TEMPERATURE COEFFICIENT OF COERCIVE FORCE

RELATIONSHIP BETWEEN AMOUNT OF Ti
AND SPECIFIC RESISTANCE

RELATIONSHIP BETWEEN AMOUNT OF Ti AND CURIE POINT Tc

RELATIONSHIP BETWEEN CALCINING TEMPERATURE
AND MAGNETIC PROPERTIES

RELATIONSHIP BETWEEN ANNEALING TEMPERATURE
AND MAGNETIC PROPERTIES

US 6,758,986 B1

MAGNET POWDER AND METHOD FOR PREPARATIONS THEREOF

TECHNICAL FIELD

The present invention relates to ferrite magnetic powder and a magnet using the magnetic powder, and to method for producing them.

BACKGROUND ART

Ferrite is a generic name of a compound composed of an oxide of divalent cation metal and a trivalent iron. A ferrite magnet is used for various applications including motors, generators, and the like. As a raw material of a ferrite magnet, Sr ferrite ($SrFe_{12}O_{19}$) or Ba ferrite ($BaFe_{12}O_{19}$) having a hexagonal structure of magnetoplumbite type is widely used. These kinds of ferrite are relatively inexpensively produced by using an iron oxide and a carbonate of strontium (Sr), barium (Ba), or the like as raw materials by means of powder metallurgy.

The fundamental composition of the magnetoplumbite-type ferrite is generally represented by a chemical formula of $MO \cdot 6Fe_2O_3$. An element M is a metal of divalent cation, and is selected from a group consisting of Sr, Ba, Pb, and the like.

It has been reported that, in Ba ferrite, when Ti and Zn were substituted for part of Fe, the magnetization was improved (see Journal of the Magnetics Society of Japan vol. 21, NoS2(1997)69-72).

In addition, it has been known that, in Ba ferrite, when La was substituted for part of Ba, and Co and Zn were substituted for part of Fe, the coercive force and the magnetization were improved (see Journal of Magnetism and Magnetic Materials vol. 31–34, (1983)793–794, Bull. Acad. Sci. USSR (Transl.), phys. Sec. vol.25 (1961) 1405–1408).

In Sr ferrite, it has been reported that, when La was substituted for part of Sr, and Co and Zn were substituted for part of Fe in the same manner as described above, the coercive force and the magnetization were improved (see International Application No.PCTJP98/00764, and International Publication No.WO98/38654).

In these ferrite magnets, however, the property improvement in both of the coercive force and the saturation magnetization is also sufficient. As for a composition in which Ti and Zn are substituted for Fe, the saturation magnetization is increased, but the coercive force is decreased.

Moreover, raw materials such as La, Co, and the like are expensive, and there arises a problem in that, if a large amount of such raw materials is used, the raw material cost is increased.

The invention has been conducted in view of the above-mentioned problems. It is a main object of the invention to provide ferrite magnetic powder and a magnet using such magnetic powder in which both of the saturation magnetization and the coercive force ate further improved at a low cost.

DISCLOSURE OF INVENTION

The magnetic powder according to the present invention is magnetic powder including ferrite having a hexagonal structure expressed by $(1-x)SrO \cdot (x/2)La_2O_3 \cdot (n-y/2-y'/2-y''/2)Fe_2O_3 \cdot yTiO_2 \cdot y'ZnO \cdot y''CoO$ as a primary phase, wherein x, y, y' and y" designating mole ratios meet $0.1 \leq x \leq 0.3$, $0.01 \leq y \leq 0.3$, $0 \leq y' \leq 0.3$, $0.1 \leq y'' \leq 0.4$, and $5.5 \leq n \leq 6.5$.

The bonded magnet of the present invention is characterized by including the above-mentioned magnetic powder.

The sintered magnet of the present invention is characterized by being formed from the above-mentioned magnetic powder. The sintered magnet includes CaO, $SiO_2$, $Cr_2O_3$, and $Al_2O_3$, and the adding amounts thereof preferably satisfy the following conditions of CaO : not lower than 0.3 wt % nor higher than 1.5 wt %, $SiO_2$: not lower than 0.2 wt % nor higher than 1.0 wt %, $Cr_2O3$: not lower than 0 wt % nor higher 5.0 wt %, and $Al_2O_3$: not lower than 0 wt % nor higher than 5.0 wt %.

The method for producing a ferrite calcined body of the present invention includes the steps of: preparing mixed raw material powder in which respective oxide powder of La, Ti, Zn, and Co are added to raw material powder of $SrCO_3$ and $Fe_2O_3$; and calcining the mixed raw material powder, thereby forming a calcined body of ferrite having a composition of $(1-x)SrO \cdot (x/2)La_2O_3 \cdot (n-y/2-y'/2-y''/2)Fe_2O_3 \cdot yTiO_2 \cdot y'ZnO \cdot y''CoO (0.1 \leq x \leq 0.3,\ 0.01 \leq y \leq 0.3,\ 0 \leq y' \leq 0.3,\ 0.1 \leq y'' \leq 0.4,\ and\ 5.5 \leq n \leq 6.5)$.

The method for producing magnetic powder according to the present invention includes the steps of: preparing mixed calcined body powder in which CaO, $SiO_2$, $Cr_2O_3$, and $Al_2O_3$ (CaO: not lower than 0.3 wt % nor higher than 1.5 wt %, $SiO_2$: not lower than 0.2 wt % nor higher than 1.0 wt %, $Cr_2O_3$: not lower than 0 wt % nor higher than 5.0 wt %, and $Al_2O_3$: not lower than 0 wt % nor higher than 5.0 wt %) are added to a calcined body produced by the above-mentioned method for producing a ferrite calcined body; and pulverizing the mixed calcined body powder.

Another method for producing magnetic powder according to the present invention includes the steps of: preparing mixed raw material powder in which respective oxide powder of La, Ti, Zn, and. Co are added to raw material powder of $SrCO_3$ and $Fe_2O_3$: calcining the mixed raw material powder, thereby forming a calcined body of ferrite having a composition of $(1-x)SrO \cdot (x/2)La_2O_3 \cdot (n-y/2-y'/2-y''/2)Fe_2O_3 \cdot yTiO_2 \cdot y'ZnO \cdot y''CoO (0.1 \leq x \leq 0.3,\ 0.01 \leq y \leq 0.3,\ 0 \leq y' \leq 0.3,\ 0.1 \leq y'' \leq 0.4,\ and\ 5.5 \leq n \leq 6.5)$; and pulverizing the calcined body.

The step of preparing mixed raw material powder includes, in addition to a case where the mixed raw material powder is prepared from the beginning, a case where mixed raw material powder which is prepared by another person is purchased and employed, and a case where powder prepared by another person is mixed.

Preferably, the calcination is performed at temperatures of not lower than 1100° C. nor higher than 1450° C.

More preferably, the calcination is performed at temperatures of not lower than 1300° C. nor higher than 1400° C.

The method for manufacturing a magnet according to the present invention includes the steps of: preparing mixed raw material powder in which respective oxide powder of La, Ti, Zn, and Co are added to raw material powder of $SrCO_3$ and $Fe_2O_3$; calcining the mixed raw material powder, thereby forming a calcined body of ferrite having a composition of $(1-x)SrO \cdot (x/2)La_2O_3 \cdot (n-y/2-y'/2-y''/2)Fe_2O_3 \cdot yTiO_2 \cdot y'ZnO \cdot y''CoO (0.1 \leq x \leq 0.3,\ 0.01 \leq y \leq 0.3,\ 0 \leq y' \leq 0.3,\ 0.1 \leq y'' \leq 0.4,\ and\ 5.5 \leq n \leq 6.5)$; preparing a mixed calcined body by mixing additives such as CaO, $SiO_2$, $Cr_2O_3$, and $Al_2O_3$ with the calcined body, pulverizing the mixed calcined body, and forming ferrite magnetic powder; and molding and sintering the ferrite magnetic powder.

The method for manufacturing a bonded magnet according to the invention includes the steps of: preparing mixed raw material powder in which respective oxide powder of La, Ti, Zn, and Co are added to raw material powder of $SrCO_3$ and $Fe_2O_3$; calcining the mixed raw material powder, thereby forming a calcined body of ferrite having a composition of $(1-x)SrO.(x/2)La_2O_3.(n-y/2-y'/2-y''/2)Fe_2O_3.yTiO_2y'ZnO.y''CoO (0.1 \leq x \leq 0.3, 0.01 \leq y \leq 0.3, 0 \leq y' \leq 0.3, 0.1 \leq y'' \leq 0.4,$ and $5.5 \leq n \leq 6.5)$; pulverizing the calcined body and forming ferrite magnetic powder; annealing the ferrite magnetic powder; and forming a bonded magnet from the annealed ferrite magnetic powder.

Preferably, the calcination is performed at temperatures of not lower than 1100° C. nor higher than 1450° C.

More preferably, the calcination is performed at temperatures of not lower than 1300° C. nor higher than 1400° C.

Preferably, the annealing is performed at temperatures of not lower than 700° C. nor higher than 1100° C.

Another magnetic powder according to the present invention is magnetic powder including ferrite having a hexagonal structure expressed by $(1-x)AO.(x/2)R_2O_3.(n-y/2-y'/2)Fe_2O_3.yTiO_2y'MeO$ as a primary phase, wherein the element A is at least one kind of element selected from a group consisting of Sr, Ba, Ca, and Pb, the element R is at least one kind of element selected from a group consisting of rare earth elements including Y and Bi, the element Me includes at least one kind of element selected from a group consisting of Co, Ni, and Zn, and x, y, and y' designating mole ratios meet $0.1 \leq x \leq 0.3$, $0.01 \leq y \leq 0.3$, $0.1 \leq y' \leq 0.4$, and $5.5 \leq n \leq 6.5$.

Preferably, the magnetic powder is calcined at temperatures of not lower than 1100° C. nor higher than 1450° C.

More preferably, the magnetic powder is calcined at temperatures of not lower than 1300° C. nor higher than 1400° C.

The magnet of the present invention is characterized by being formed from the above-mentioned magnetic powder.

BEST MODE FOR CARRYING OUT THE INVENTION

Magnetic powder of the present invention includes a primary phase of ferrite expressed by $(1-x)SrO.(x/2)La_2O_3.(n-y/2-y'/2-y''/2)Fe_2O_3.yTiO_2.y'ZnO.y''CoO$. La is substituted for part of Sr, and the amount of substitution x is in the range of $0.1 \leq x \leq 0.3$. Ti, Zn, and Co are substituted for part of Fe, and the amount of substitution y is in the range of $0.01 \leq y \leq 0.3$. A composition ratio y' is in the range of $0 \leq y' \leq 0.3$, and a composition ratio y'' is in the range of $0.1 \leq y'' \leq 0.4$.

In order to substitute $Co^{2+}$ and $Zn2+$ having a different number of valence for $Fe^{3+}$ of a magnetoplumbite-type ferrite, it is necessary to perform charge compensation. In the present invention, La is substituted for part of Sr, and $Ti^{4+}$ is substituted for part of $Fe^{3+}$, so as to compensate for the difference in the number of valence. Accordingly, it is preferred that the amounts of substitution be satisfy a condition of x+y=y'+y'', but the present invention is not limited to the case of x+y=y'+y''.

Hereinafter, an embodiment of the present invention will be described with reference to the accompanying drawings.

Figure 1:
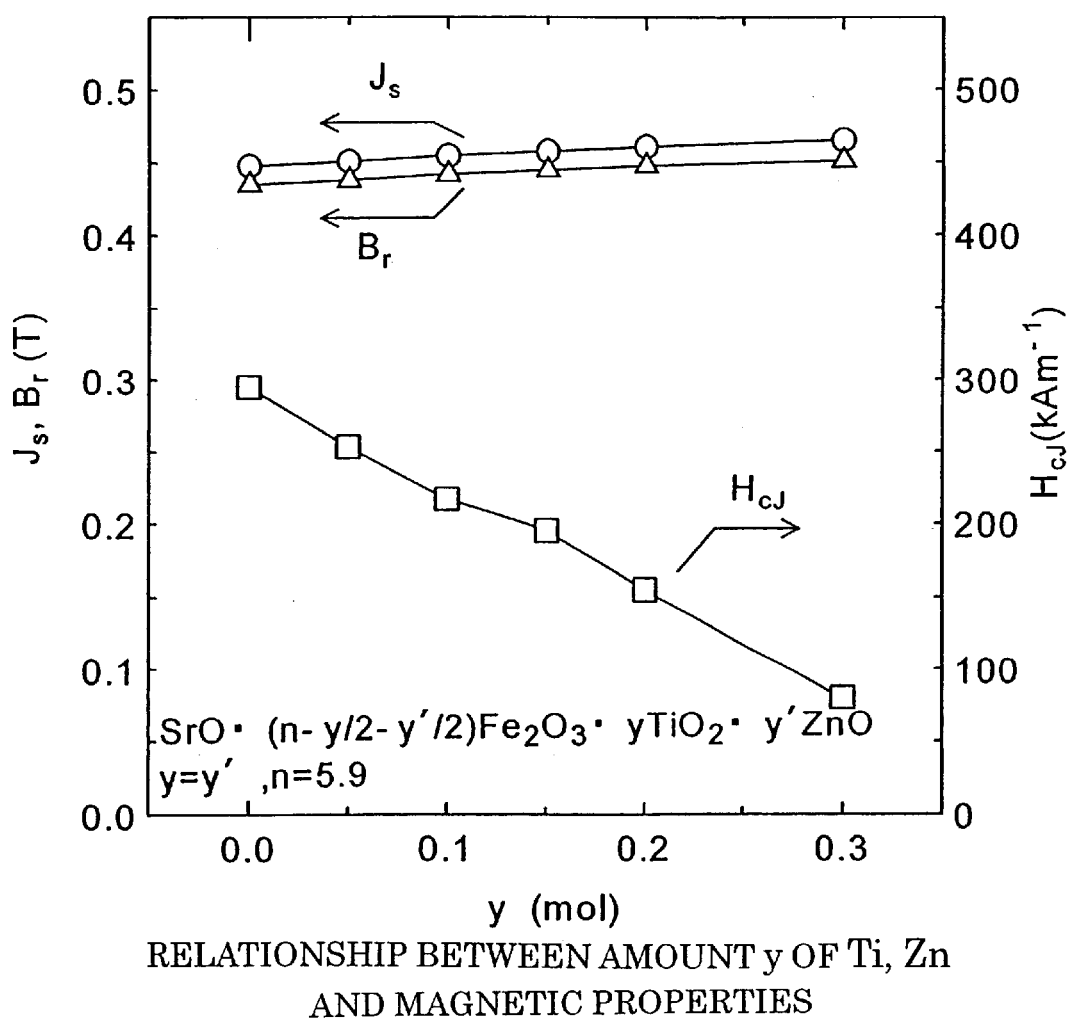
FIG. 1 is a graph showing magnetic properties of a sintered body in the case where composition ratios y and y' in an embodiment of the invention are varied (x=y''0, y=y', and n=5.9).

FIG. 1 is a graph showing magnetic properties of a sintered body in the case where composition ratios y and y' in conditions of x=y''=0, y=y', and n=5.9 in $(1-x)SrO.(x/2)La_2O_3.(n-y/2-y'/2-y''/2)Fe_2O_3.yTiO_2.y'ZnO.y''CoO$. In other words, the sintered body is obtained by substituting Zn for part of Fe, and by substituting Ti for part of Fe for the purpose of charge compensation in $SrO.nFe_2O_3$ (n=5.9). As shown in FIG. 1, a phenomenon that when a ratio y (=y') for substituting Zn and Ti for Fe is increased, the coercive force ($H_{cJ}$) is lowered, but the magnetization ($B_r$) is improved is observed.

Figure 2:
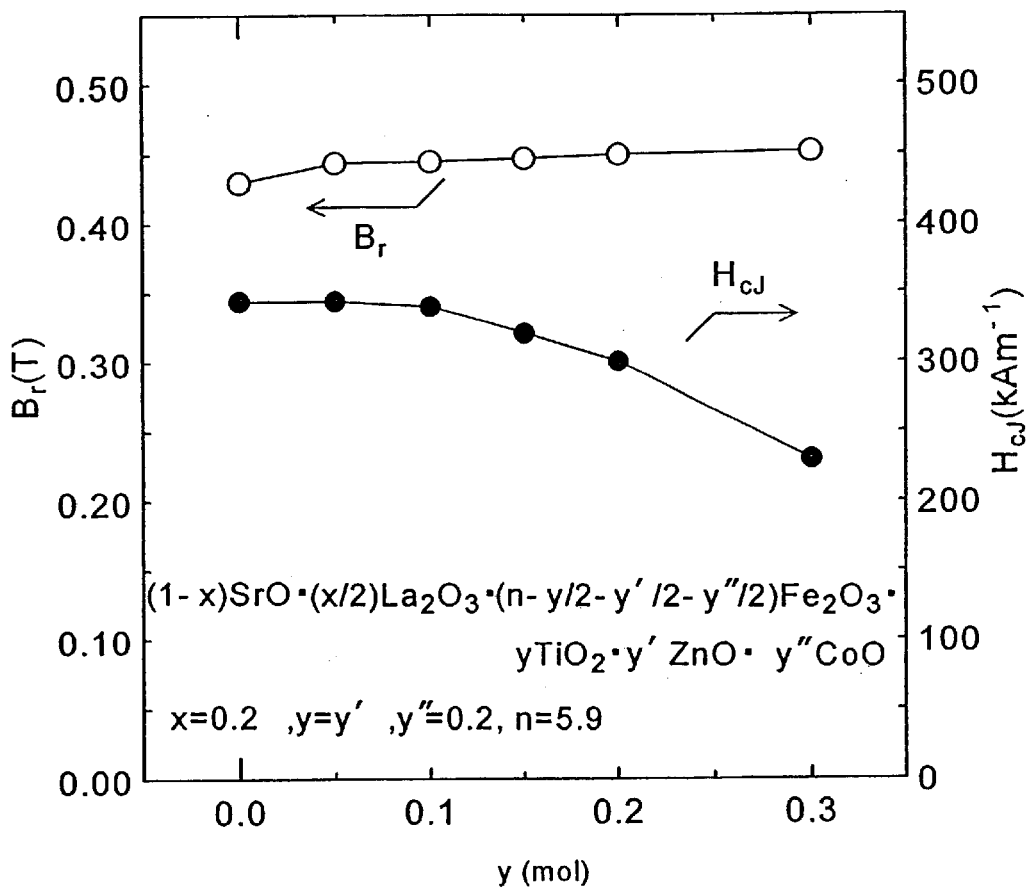
FIG. 2 is a graph showing magnetic properties of a sintered body in the case where the composition ratios y and y' in the embodiment of the invention are varied (x=0.2, y=y', y''=0.2, and n=5.9).

FIG. 2 is a graph showing magnetic properties of a sintered body in the case where the composition ratios y and y' are varied in conditions of x=0.2, y=y', y''=0.2, and n=5.9 in $(1-x)SrO.(x/2)La_2O_3 (n-y/2-y'/2-y''/2)Fe_2O_3.yTiO_2.y'ZnO.y''CoO$. The sintered body is obtained by substituting Co and Zn for part of Fe, and by substituting La for part of Sr, and substituting Ti for part of Fe for the purpose of charge compensation in $SrO.nFe_2O_3$ (n=5.9). As shown in FIG. 2, a phenomenon that when an amount y'(=y) for substituting Zn for Fe is increased, the lowering of the coercive force is small, and the magnetization is improved is observed.

Figure 3:
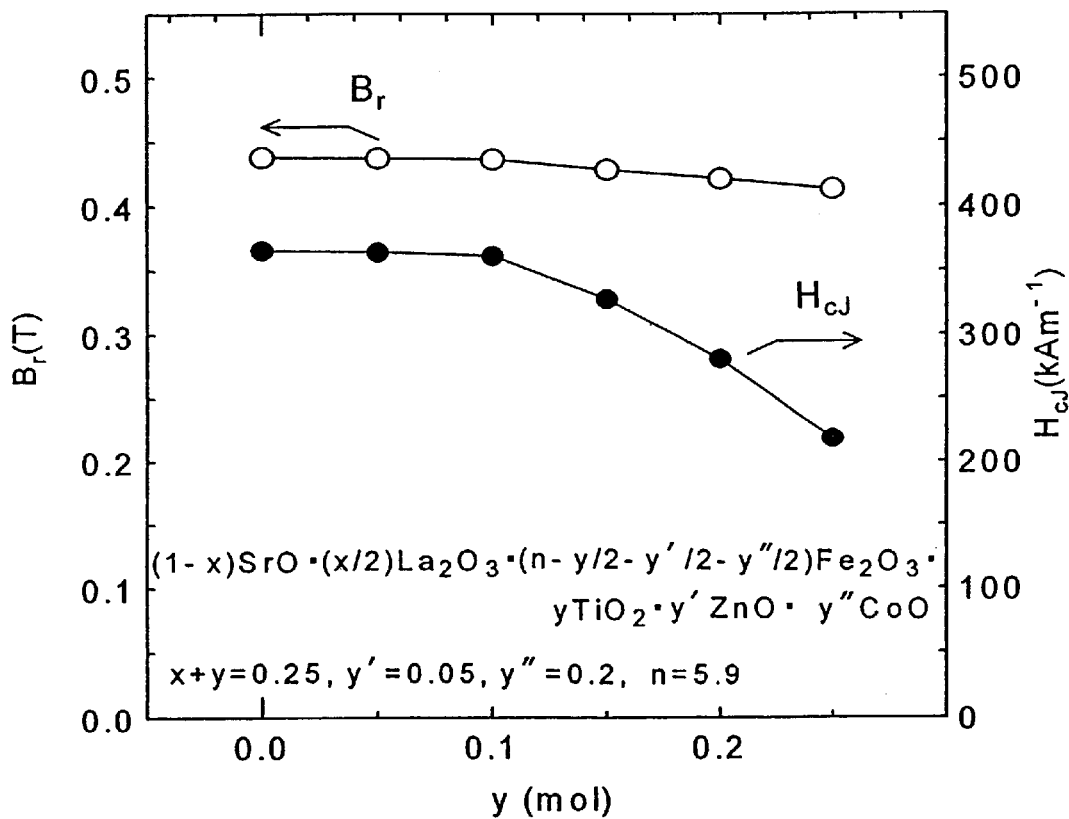
FIG. 3 is a graph showing magnetic properties of a sintered body in the case where the composition ratio y in the embodiment of the invention is varied (x+y=0.25, y'=0.05, y''=0.2, and n=5.9).

FIG. 3 is a graph showing magnetic properties of a sintered body in the case where the composition ratio y is varied in conditions of x+y=0.25, y'=0.05, y''=0.2, and n=5.9 in $(1-x)SrO.(x/2)La_2O_3(n-y/2-y'/2-y''/2)Fe_2O_3.yTiO_2.y'ZnO.y''CoO$. The sintered body is obtained by substituting Co and Zn for part of Fe, and by substituting La for part of Sr, and substituting Ti for part of Fe for the purpose of charge compensation in $SrO.nFe_2O3$ (n=5.9). This point is similar to the case of FIG. 2. A different point from the case of FIG. 2 is that x +y is kept at a constant value of 0.25. In this case, as shown in FIG. 3, a phenomenon that when an amount y for substituting Ti for Fe is increased, the lowering of the coercive force is small, and the magnetization exhibits a substantially constant value is observed. Ti is inexpensive as compared with La. For this reason, if the charge compensation is preformed not only by La, but also by Ti additionally, cost down can be attained.

Figure 4:
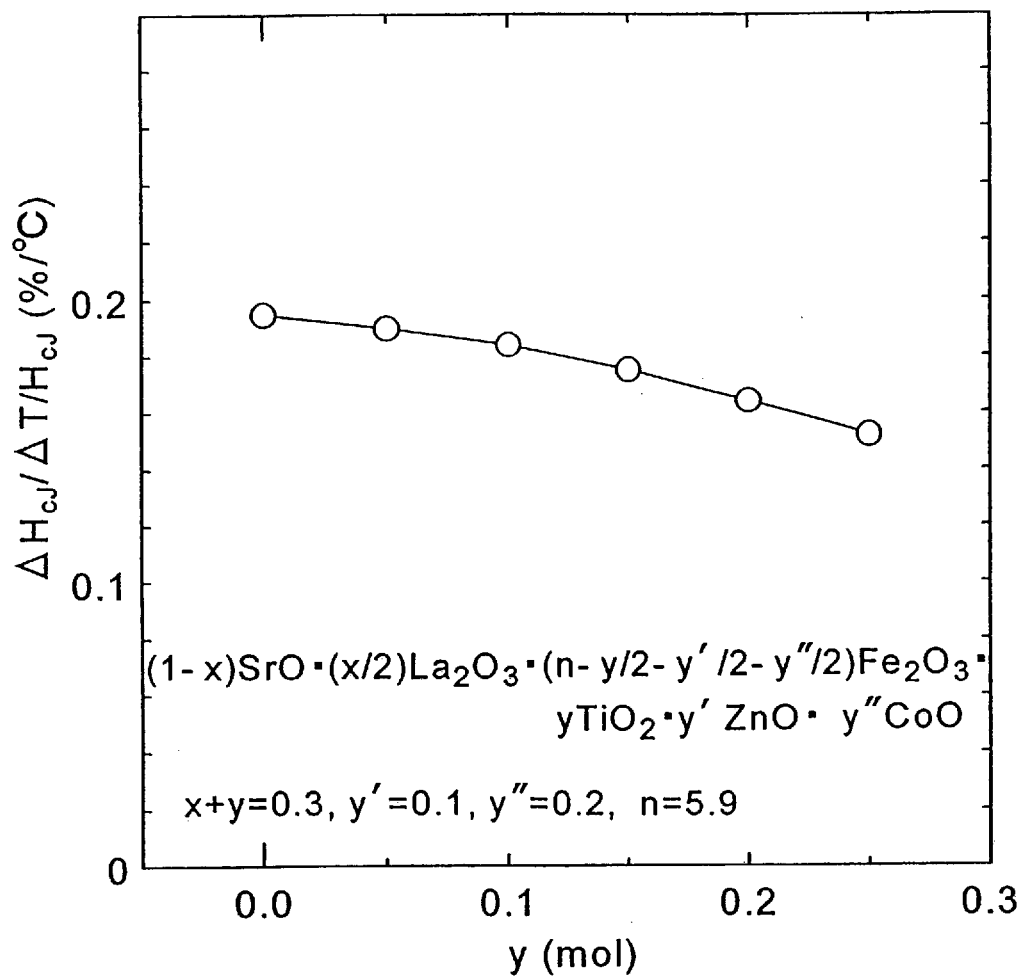
FIG. 4 is a graph showing a temperature coefficient of the coercive force of a sintered body in the case where the composition ratio y in the embodiment of the invention is varied (x+y=0.3, y'=0.1, y''=0.2, and n=5.9).

FIG. 4 is a graph showing magnetic properties of a sintered body in the case where the composition ratio y is varied in conditions of x+y=0.3, y'=0.1, y"=0.2, and n=5.9 in $(1-x)SrO.(x/2)La_2O_3(n-y/2-y'/2-y"/2)Fe_2O_3.yTiO_2.y'ZnO.y"CoO$. The sintered body is obtained by substituting Co and Zn for part of Fe, and by substituting La for part of Sr, and substituting Ti for part of Fe for the purpose of charge compensation in $SrO.nFe_2O_3(n=5.9)$. From FIG. 4, a phenomenon that when the amount y for substituting Ti for Fe is increased, a temperature coefficient of the coercive force is lowered is observed.

Figure 5:
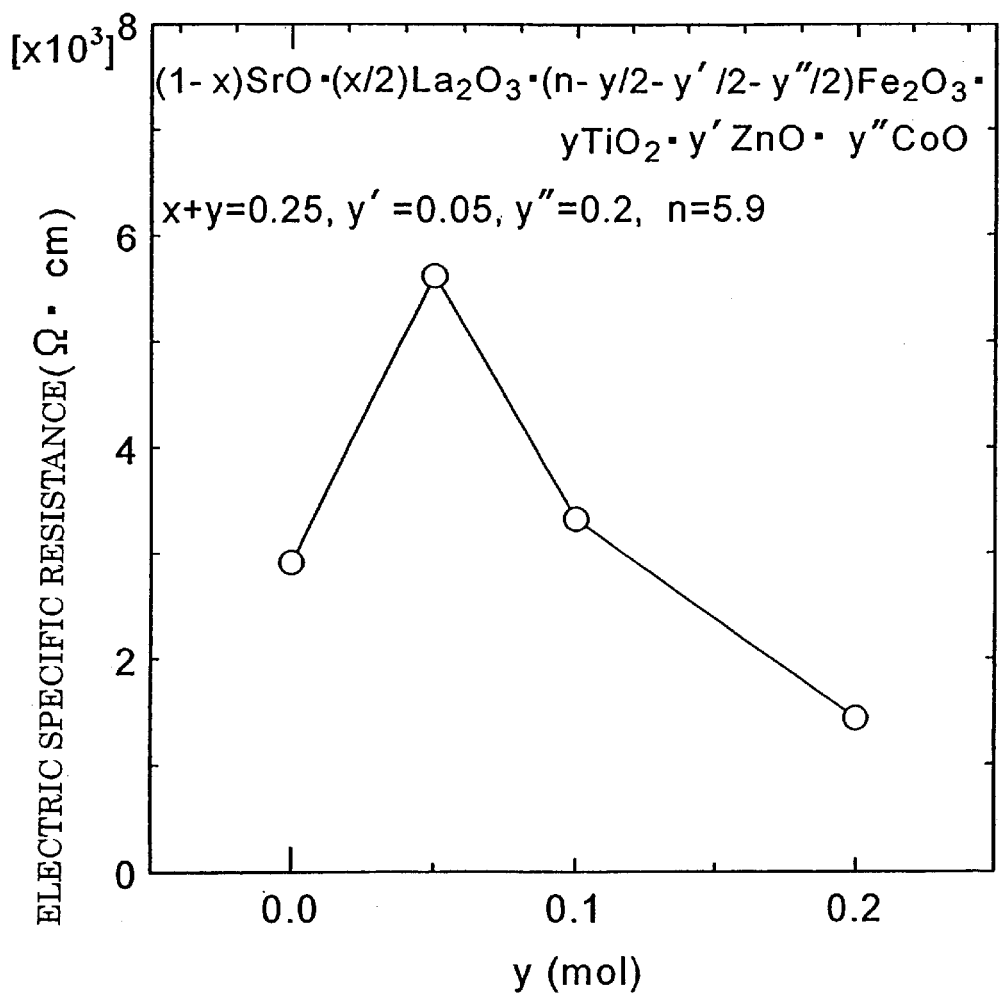
FIG. 5 is a graph showing an electric specific resistance (unit of $\Omega \cdot cm$) of a sintered body in the case where the composition ratio y in the embodiment of the invention is varied (x+y=0.25, y'=0.05, y''=0.2, and n=5.9).
Figure 6:
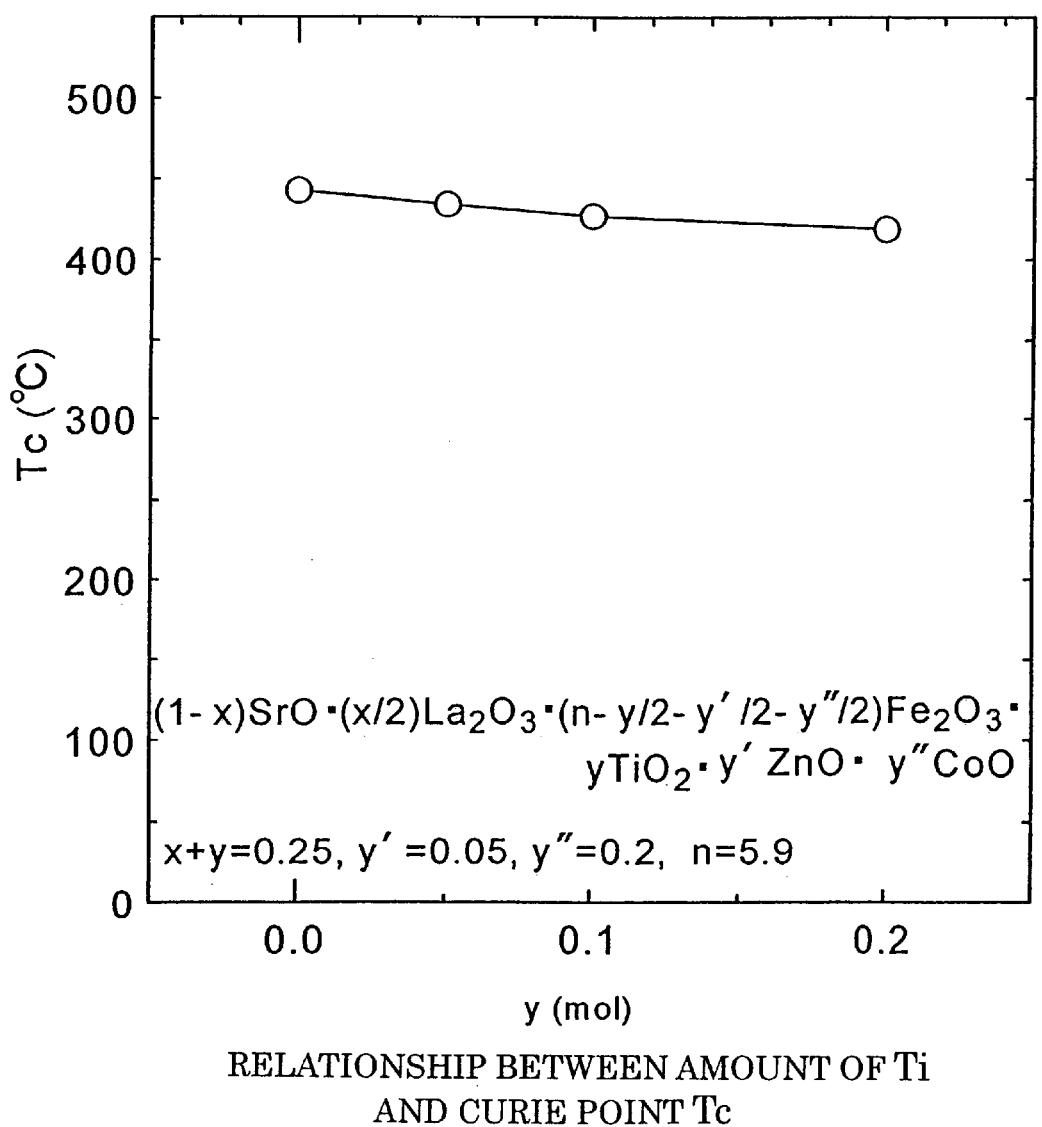
FIG. 6 is a graph showing a Curie point Tc (unit of ° C.) of a sintered body in the case where the composition ratio y in the embodiment of the invention is varied (x+y=0.25, y'=0.05, y''=0.2, and n=5.9).

FIG. 5 is a graph showing magnetic properties of a sintered body in the case where the composition ratio y is varied in conditions of x+y=0.25, y'=0.05, y"=0.2, and n=5.9 in $(1-x)SrO.(x/2)La_2O_3(n-y/2-y'/2-y"/2)Fe_2O_3.yTiO_2.y'ZnO.y"CoO$. The sintered body is obtained by substituting Co and Zn for part of Fe, and by substituting La for part of Sr, and substituting Ti for part of Fe for the purpose of charge compensation in $SrO.nFe_2O_3(n=5.9)$. As shown in FIG. 5, a phenomenon that when the amount y for substituting Ti for Fe is in the range of 0 to 0.1, an electric specific resistance of a magnet is increased is observed. Also, in this case, as shown in FIG. 6, a phenomenon that as the amount y for substituting Ti for Fe is increased, a Curie point Tc is lowered is observed.

Figure 7:
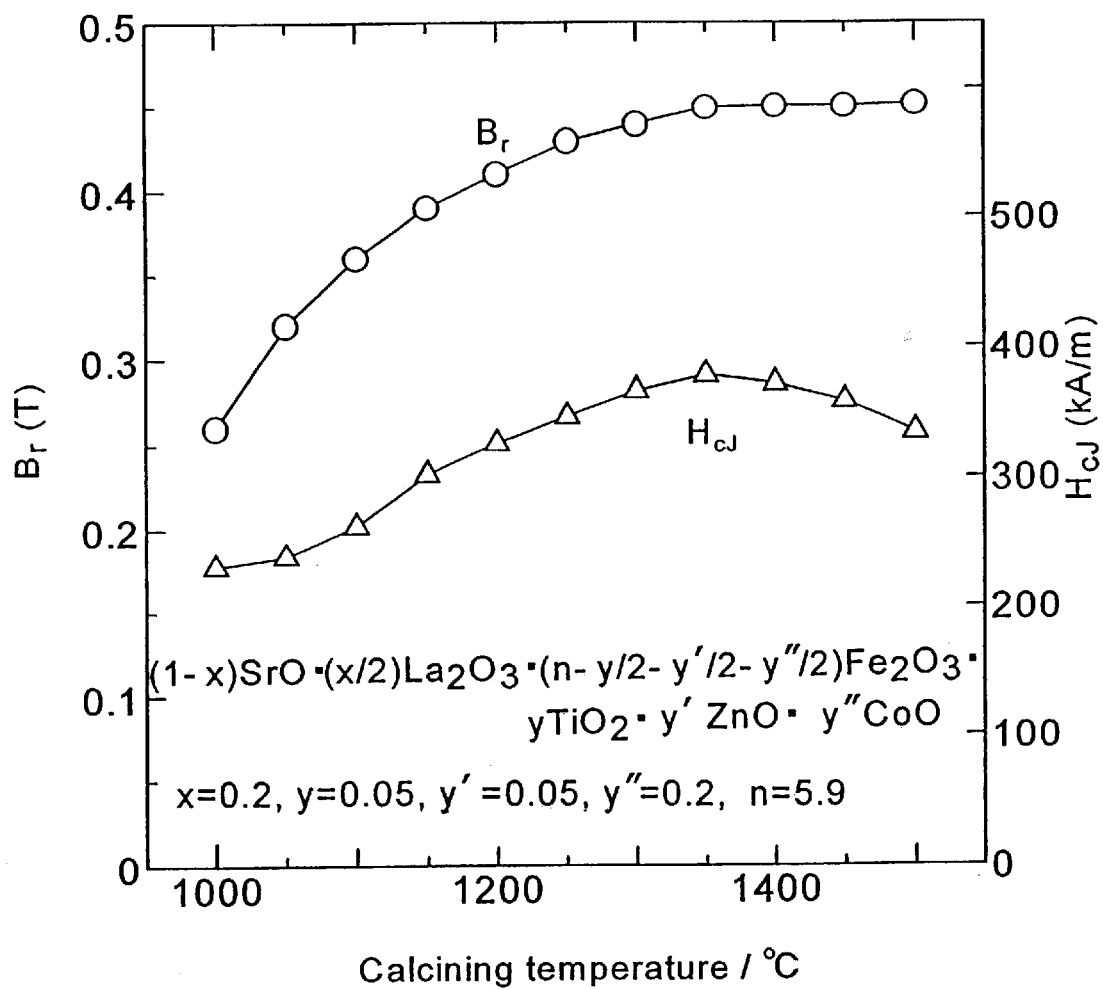
FIG. 7 is a graph showing magnetic properties (Br: unit of tesa) of a sintered body in the case where a calcining temperature in the embodiment of the invention is varied (x=0.2, y=0.05, y'=0.05, y''n=0.2, and n=5.9).

FIG. 7 is a graph showing a relationship between a calcining temperature and magnetic properties in conditions of x=0.2, y=0.05, y'=0.05, y"0.2, and n=5.9 in $(1-x)SrO.(x/2)La_2O_3(n-y/2-y'12-y"/2)Fe_2O_3.yTiO_2.y'ZnO.y"CoO$. In a calcining process, a ferrite phase is formed by solid phase reaction with the rise of temperature, and completed at about 1100° C. At temperatures equal to or lower than the temperature, hematite (iron oxide) which is not yet reacted remains, so that the magnetic properties are low. When the calcining temperature becomes equal to or higher than 1100° C., the effects of the present invention are attained. The effects are increased together with the rise of temperature, but the effects of the present invention are relatively small in the range of calcining temperature of 1100 to 1200° C. On the other hand, when the calcining temperature exceeds 1450° C., crystal grains grow to be too large. This may result in disadvantages such as that it takes an extremely long time to perform pulverization in the pulverizing process.

It is most preferred that the calcining temperature be set in a temperature range of not lower than 1300° C. nor higher than 1400° C.

[REASONS FOR LIMITING COMPOSITION RATIOS]

It is found from the results of experiments explained with reference to FIG. 1 to FIG. 7, and the like that the amount y of substituting Ti for Fe preferably satisfies a condition of $0.01 \leq y \leq 0.3$. More preferably, the amount satisfies a condition of $0.01 \leq y \leq 0.1$.

According to the experiments by the inventors, it is found that a magnet exhibits preferable properties in the case of $0.1 \leq x \leq 0.3$, $0 \leq y' \leq 0.3$, $0.1 \leq y" \leq 0.4$, and $5.5 \leq n \leq 6.5$.

Next, a method for producing magnetic powder according to the present invention will be described.

First, powder of $SrCO_3$ and powder of $Fe_2O_3$ are mixed at a mole ratio in the range of 1:5.5 to 1:6.5. At this time, $La_2O_3$, $TiO_2$, ZnO, CoO, and the like are added to the raw material powder.

As for the addition of La, Ti, Zn, and Co, it is preferred that the respective oxide powder thereof be added. Alternatively, they may be added in powder or solution state of powder other than oxides (for example, carbonate, hydroxide, nitrate, chloride, and the like).

To the above-mentioned powder, another compound including $B_2O_3$, $H_3BO_3$, and the like may be added at about 1 weight % as required.

The mixed raw material powder is next heated to temperatures 1100° C. to 1450° C. by using a rotary kiln, or the like, so as to form a magnetoplumbite-type ferrite compound by solid phase reaction. The process is referred to as "calcination", and the obtained compound is referred to as a "calcined body". The period of calcining time is preferably 0.5 to 5 hours. The effects of the present invention are the largest at calcining temperatures of not lower than 1300° C. nor higher than 1400° C.

The calcined body obtained by the calcining process includes a primary phase of magnetoplumbite-type ferrite represented by the following chemical formula, and an average particle diameter is in the range of 0.1 to 10 μm.

The magnetic powder of the present invention can be obtained by pulverizing and/or deagglomerating the calcined body.

Next, a method for manufacturing a ferrite magnet of the present invention will be described.

First, a calcined body is produced by the above-described method. Next, additions such as CaO, $SiO_2$, $Cr_2O_3$, $Al_2O_3$, and the like are mixed with the calcined body, so as to form a calcined mixed body. The calcined mixed body is ground in a pulverization process using a vibrating mill, a ball mill, and/or an attritor into fine particles. An average particle diameter of the fine particles is preferably in the range of about 0.4 to 0.7 μm (Fisher sub-sieve-sizer). The pulverization process is preferably performed by combining dry pulverization and wet pulverization. In the wet pulverization, an aqueous solvent such as water and various nonaqueous solvents can be used. In the wet pulverization, slurry in which the solvent and the calcined body powder are mixed is produced. It is preferred that various known dispersing agents and surface active agents be added to the slurry.

Thereafter, while the solvents in the slurry is removed, the slurry is pressed and molded in a magnetic field or in a nonmagnetic field. After the pressing and molding, the known production processes such as a degreasing process, a sintering process, a work process, a washing process, a check process, and the like are performed, and then a product of a ferrite magnet is finally completed. The sintering process may be performed in a temperature range of 1200° C. to 1250° C. for 0.5 to 2 hours. An average particle diameter of a sintered magnet obtained in the sintering process is 0.5 to 2 μm, for example.

The ferrite magnetic powder may be mixed and bonded with a rubber with flexibility, a rigid and light plastic, or the like, so as to manufacture a bonded magnet. In this case, after the magnetic powder of the present invention is mixed with a binder and an additive, the shaping process is performed. The shaping process is performed by a method such as injection molding, extrusion, rolling, or the like. In the case of being used as the bonded magnet, the annealing of the ferrite magnetic powder may be performed in a temperature range of not lower than 700° C. but lower than 1100° C. for 0.1 to 3 hours. It is more preferred that the annealing temperature range is set to be not lower than 900° C. nor higher than 1000° C.

Figure 8:
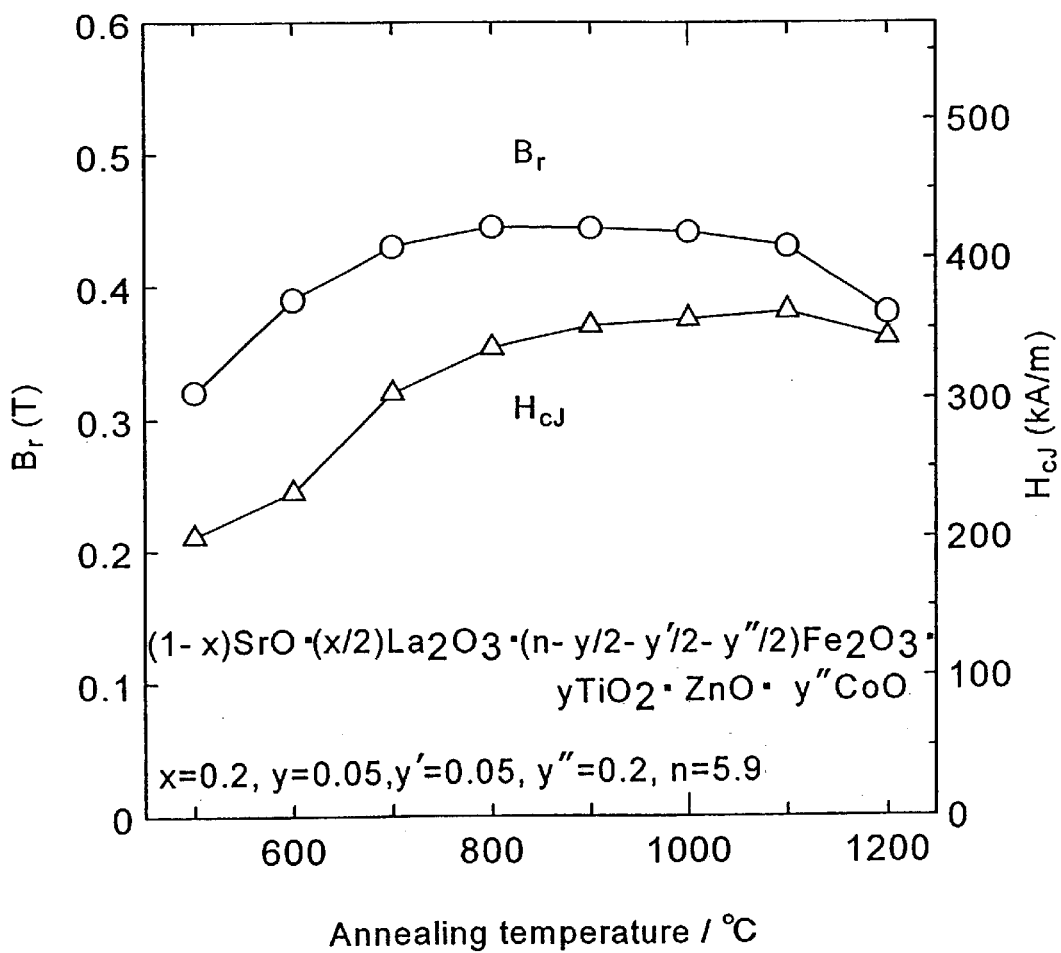
FIG. 8 is a graph showing magnetic properties (Br: unit of tesla) of magnetic powder in the case where an annealing temperature in the embodiment of the invention is varied (x=0.2, y=0.05, y'0.05, y''=0.2, and n=5.9).

Next, the temperature range will be described. FIG. 8 shows a relationship between an annealing temperature and magnetic properties. As shown in FIG. 8, the coercive force ($H_{cJ}$) is increased as the rise of the temperature, and decreased when the temperature exceeds 1100° C. It is considered that this is because the distortion introduced in the pulverization process is relaxed by the annealing, thereby recovering the coercive force. The value of the coercive force has a practical magnitude in the annealing temperature range of not lower than 700° C. nor higher than 1100° C. The coercive force lowers when the annealing temperature exceeds 1100° C. It is considered that this is because grain growth of the powder particles is started.

On the other hand, the magnetization ($B_r$) is increased with the coercive force until the annealing temperature reaches 1000° C. The degree of alignment lowers at temperatures equal to or higher than the temperature, so that the magnetization is decreased. It is considered that this is because fusion between powder particles occurs.

Instead of Sr, at least one kind of element selected from a group consisting of Ba, Ca, and Pb maybe used. Alternatively, instead of La or together with La, at least one kind of element selected from a group consisting of rare earth elements including Y and Bi may be substituted for part of Sr.

Example 1

Material powder blended in a composition of $(1-x)SrO \cdot (x/2)La_2O_3 \cdot (n-y/2-y'/2-y''/2)Fe_2O_3 \cdot yTiO_2 \cdot y'ZnO \cdot y''CoO$ in conditions of x=0.2, y=0.05, y'=0.05, and y''=0.2 was calcined at 1350° C., so as to produce magnetic powder according to the present invention.

Next, after the magnetic powder was further pulverized so as to have a diameter of 0.52 μm, $CaCo_3$=0.7 wt % and $SiO_2$=0.4% were added to and mixed with the obtained pulverized powder. The thus-obtained pulverized powder was molded in a magnetic field, and then sintered at 1230° C. for 30 minutes, so as to manufacture a sintered magnet.

As for the magnetic properties of the obtained sintered magnet, the remanence $B_r$ was 4.4 kG, the coercive force $H_{cJ}$ was 4.4 kOe, and $(BH)_{max}$ was 4.7 MGOe. The electric specific resistance of the sintered magnet was $5.6 \times 10^{-3} \Omega \cdot cm$.

Example 2

The mixing of raw materials was performed in a composition of $(1-x)SrO \cdot (x/2)La_2O_3 \cdot (n-y/2-y'/2-y''/2)Fe_2O_3 \cdot yTiO_2 \cdot y'ZnO \cdot y''CoO$ so as to satisfy the conditions of x=0.2, y=0.1, y'=0.1, and y''=0.2, and a sintered magnet was manufactured by the same operation as that of Example 1.

The temperature coefficient related to the coercive force of the obtained sintered magnet was −0.19%/° C.

Example 3

The mixing of raw materials was performed in a composition of $(1-x)SrO \cdot (x/2)R_2O_3 \cdot (n-y/2y'/2-y''/2)Fe_2O_3 \cdot yTiO_2 \cdot y'ZnO \cdot y''CoO$ so as to satisfy the conditions of x=0.2, y=0.1, y'0.1, and y''=0.2.

As the element R A, combinations of 0.15 of La and 0.02 of Ce, 0.15 of La and 0.05 of Pr, and 0.15 of La and 0.05 of Nd were used, and a sintered magnet was manufactured by the same operation as that of Example 1.

The magnetic properties of the obtained sintered magnet are shown in Table 1.

TABLE 1

| Element B | Br(T) | HcJ(kA/m) | (BH)max(kJ/m³) |
|---|---|---|---|
| Ce | 0.433 | 346 | 35.8 |
| Pr | 0.441 | 348 | 37.4 |
| Nd | 0.439 | 353 | 36.6 |

Example 4

CaO, $SiO_2$, $Cr_2O_3$, and $Al_2O_3$ were added to the magnetic powder in Example 1, so as to produce magnetic powder in the same operation as that of Example 1. A sintered magnet was manufactured by using the powder.

The magnetic properties of the obtained sintered magnet are shown in Table 2.

TABLE 2

| CaO (wt %) | SiO₂ (wt %) | Cr₂O₃ (wt %) | Al₂O₃ (wt %) | Br (T) | HcJ (kA/m) | (BH)max (kJ/m³) |
|---|---|---|---|---|---|---|
| 0.3 | 0.3 | 0 | 0 | 0.433 | 346 | 35.8 |
| 0.6 | 0.3 | 0 | 0 | 0.441 | 348 | 37.4 |
| 0.6 | 0.45 | 1.0 | 0 | 0.431 | 368 | 35.0 |
| 0.6 | 0.45 | 0 | 1.0 | 0.433 | 362 | 35.0 |
| 0.6 | 0.45 | 0.5 | 0.5 | 0.429 | 367 | 34.2 |

INDUSTRIAL APPLICABILITY

According to the present invention, La is substituted for part of Sr and Ti is substituted for part of Fe for the purpose of charge compensation, so that both of the satutation magnetization and the coercive force of a calcined body, magnetic powder, and a sintered body are simultaneously improved. In addition, it is possible to increase the electric specific resistance of a magnet, and to lower the temperature coefficient of the coercive force. Accordingly, it is possible to manufacture a magnet with superior magnetic properties at a low cost.

What is claimed is:

1. A bonded magnet including the magnetic powder, said magnetic powder including ferrite having a hexagonal structure expressed by $(1-x)SrO \cdot (x/2)La_2O_3 \cdot (n-y/2-y'/2-y''/2)Fe_2O_3 \cdot yTiO2 \cdot y'ZnO \cdot y''CoO$ as a primary phase, wherein x, y, y', y'' designating mole ratios meet $0.1 \leq x \leq 0.3$, $0.01 \leq y \leq 0.3$ $0 < y' \leq 0.3$, $0 \leq y'' \leq 0.4$, and $5.5 \leq n \leq 6.5$.

2. A sintered magnet formed from magnetic powder, said magnetic powder including ferrite having a hexagonal structure expressed by $(1-x)SrO \cdot (x/2)La_2O_3 \cdot (n-y/2-y'/2-y''/2)Fe_2O_3 \cdot yTiO2 \cdot y'ZnO \cdot y''CoO$ as a primary phase, wherein x, y, y', y'' designating mole ratios meet $0.1 \leq x \leq 0.3$, $0.01 \leq y 0.3$, $0 < y' \leq 0.3$, $0.1 \leq y'' \leq 0.4$, and $5.5 \leq n \leq 6.5$, wherein the sintered magnet further includes CaO, $SiO_2$, $Cr_2O_3$, and $Al_2O_3$, the adding amounts thereof satisfying the following conditions of CaO: not lower than 0.3 wt % nor higher than 1.5 wt %, SiO$_2$: not lower than 0.2 wt % nor higher than 1.0 wt %, Cr$_2$O$_3$: not lower than 0 wt % nor higher than 5.0 wt %, and Al$_2$O$_3$: not lower than 0 wt % nor higher than 5.0 wt %.

3. A method for producing a ferrite calcined body, comprising the steps of:

preparing mixed raw material powder in which respective oxide powder of La, Ti, Zn, and Co are added to raw material powder of SrCO$_3$ and Fe$_2$O$_3$; and calcining the mixed raw material powder, thereby forming a calcined body of ferrite having a composition of $(1-x)SrO.(x/2)La_2O_3.(n-y/2-y'/2-y''/2)Fe_2O_3.yTiO_2.y'ZnO.y''CoO$ ($0.1 \leq x \leq 0.3$, $0.01 \leq y \leq 0.3$, $0 \leq y' < 0.3$, $0.1 \leq y'' \leq 0.4$, and $5.5 \leq n \leq 6.5$).

4. A method for producing magnetic powder, comprising the steps of:

preparing mixed raw material powder in which respective oxide powder of La, Ti, Zn, and Co are added to raw material powder of SrCO$_3$ and Fe$_2$O$_3$;

calcining the mixed raw material powder, thereby forming a calcined body of ferrite having a composition of $(1-x)SrO.(x/2)La_2O_3.(n-y/2-y'/2-y''/2)Fe_2O_3.yTiO_2-y'ZnO.y''CoO$ ($0.1 \leq x \leq 0.3$, $0.01 \leq y \leq 0.3$, $0 \leq y' < 0.3$, $0.1 \leq y'' \leq 0.4$, and $5.5 \leq n \leq 6.5$); and pulverizing the calcined body.

5. A method for producing magnetic powder according to claim 4, wherein the calcination is performed at temperatures of not lower than 1100° C. nor higher than 1450° C.

6. A method for producing magnetic powder according to claim 4, wherein the calcination is performed at temperatures of not lower than 1300° C. nor higher than 1400° C.

7. A method for producing magnetic powder, comprising the steps of:

preparing mixed calcined body powder in which CaO, SiO$_2$, Cr$_2$O$_3$, and Al$_2$O$_3$ (CaO: not lower than 0.3 wt % nor higher than 1.5 wt %, SiO$_2$: not lower than 0.2 wt % nor higher than 1.0 wt %, Cr$_2$O$_3$: not lower than 0 wt % nor higher than 5.0 wt %, and Al$_2$O$_3$: not lower than 0 wt % nor higher than 5.0 wt %) are mixed with a calcined body produced by a method for producing a ferrite calcined body according to claim, and pulverizing the mixed calcined body powder.

8. A method for manufacturing a magnet, comprising the steps of:

preparing magnetic powder including ferrite having a hexagonal structure expressed by $(1-x)SrO.(x/2)La_2O_3.(n-y/2-y'/2-y''/2)Fe_2O_3.yTiO_2.y'ZnO.y''CoO$ as a primary phase, wherein x, y, y', y'', designating mole ratios meet $0.1 \leq x \leq 0.3$, $0.01 \leq y \leq 0.3$, $0 < y' \leq 0.3$, $0.1 \leq y'' \leq 0.4$, and $5.5 \leq n \leq 6.5$; and molding and sintering the magnetic powder.

9. A method for manufacturing a magnet, comprising the steps of:

annealing magnetic powder including ferrite having a hexagonal structure expressed by $(1-x)SrO.(x/2)La_2O_3.(n-y/2-y'/2-y''/2)Fe_2O_3.yTiO_2.y'ZnO.y''CoO$ as a primary phase, wherein x, y, y', y'' designating mole ratios meet $0.1 \leq x \leq 0.3$, $0.01 \leq y \leq 0.3$, $0 < y' \leq 0.3$, $0.1 \leq y'' \leq 0.4$, and $5.5 \leq n \leq 6.5$; and forming a bonded magnet from the annealed magnetic powder.

10. A method for manufacturing a magnet according to claim 9, wherein the annealing is performed at temperatures of not lower than 700° C. nor higher than 1100° C.

11. Magnetic powder including ferrite having a hexagonal structure expressed by $(1-x)SrO.(x/2)La_2O_3.(n-y/2-y'/2-y''/2)Fe_2O_3.yTiO_2.y'ZnO.y''CoO$ as a primary phase, wherein x, y, y', y'' designating mole ratios meet $0.1 \leq x \leq 0.3$, $0.01 \leq y \leq 0.3$, $0 < y' \leq 0.3$, $0.1 \leq y'' \leq 0.4$, and $5.5 \leq n \leq 6.5$.

* * * * *